Feb. 6, 1968
J. A. HARPER
3,368,045
FLOW INDICATOR UTILIZING PERMANENT
MAGNETS FOR SWITCH ACTUATION
Filed Nov. 30, 1964
2 Sheets-Sheet 1
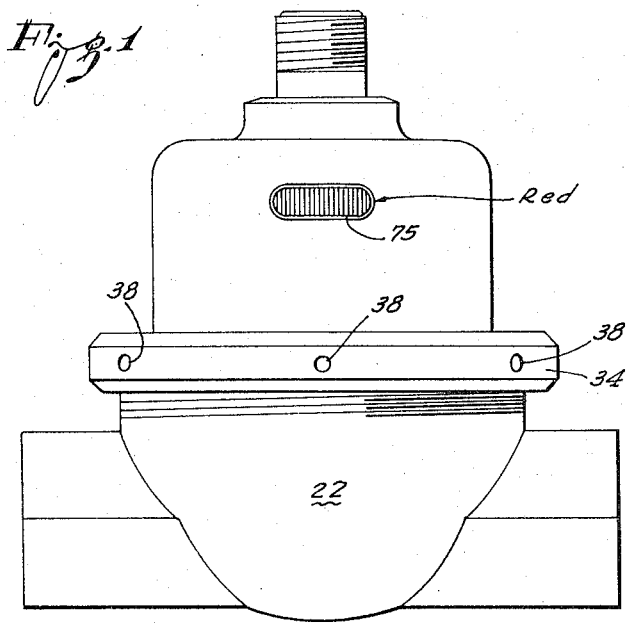
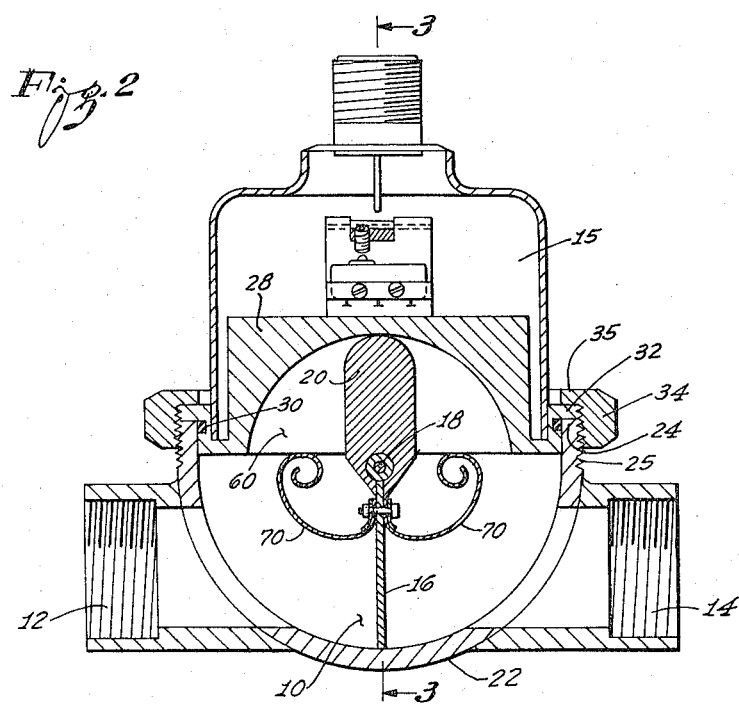
INVENTOR:
Jay A. Harper

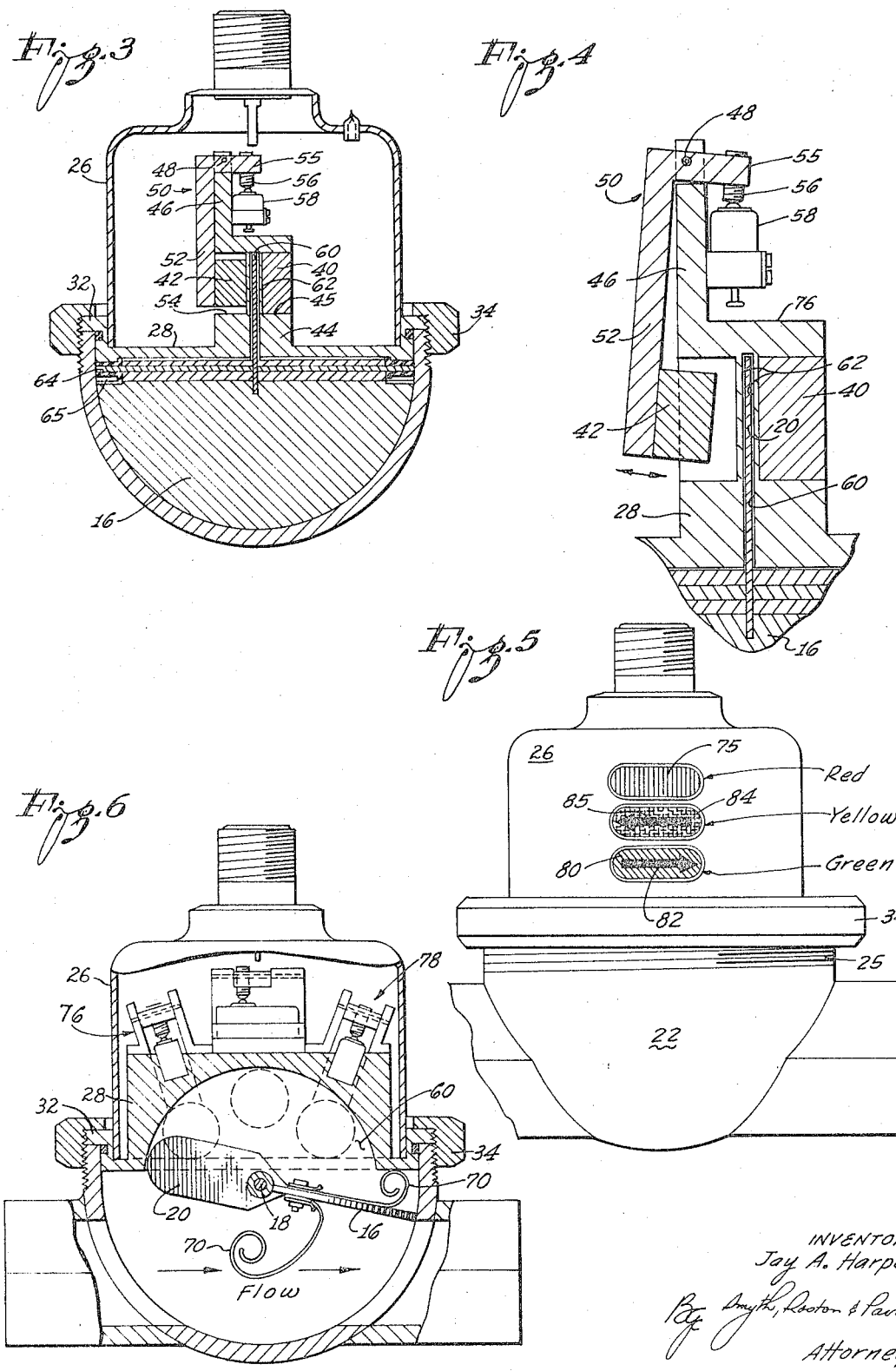

3,368,045
FLOW INDICATOR UTILIZING PERMANENT
MAGNETS FOR SWITCH ACTUATION
Jay A. Harper, Gardena, Calif., assignor to Acme Machine Works, Inc., Hawthorne, Calif., a corporation of California
Filed Nov. 30, 1964, Ser. No. 414,629
9 Claims. (Cl. 200—81.9)

ABSTRACT OF THE DISCLOSURE

A flow meter has a vane extending across the path of fluid flow to be deflected thereby and a thin ferromagnetic blade connected to the vane swings edgewise between two closely spaced parallel walls of the fluid passage. A pair of permanent magnets with opposed holes straddle the parallel walls and are isolated from the fluid thereby. One of the permanent magnets operates a switch by movement in response to changes in the magnetic repellant propulsion force caused by the presence or absence of the ferromagnetic blade.

---

This invention relates to means to detect a change in a condition and, more particularly a change in position of a member which may itself be responsive to a change in a condition. While the invention is widely applicable for detecting and/or indicating changes in positions of members such as condition-responsive members of various types, it has been initially embodied in a flow indicator to detect or indicate the existence or nonexistence of fluid flow in a passage. The description herein of the flow indicator will provide adequate guidance for those skilled in the art who may have occasion to apply the same basic concept for other specific purposes.

A number of different needs for improvement in flow indicators have become apparent in the different specific uses of such devices and the broad object of the present invention is to provide a flow indicator that is universally applicable in the sense of being readily adaptable to meet these various needs.

One pressing need arises from the relatively high cost of fluid flow indicators that are adequately sensitive and at the same time dependable over long service periods. The invention meets this need by providing a flow indicator that may be made out of relatively inexpensive plastic material and may be fabricated economically for mass production by injection molding. In this regard a feature of the invention is that the screw threads required for connecting the device into a pipeline may be formed by the molding operation with no necessity for separate thread cutting operations.

Another need for improvement is to provide a bi-directional device that will respond to fluid flow in either direction. The bi-directional responsiveness eliminates the need for particular orientation of the device in a fluid system and, of course, eliminates the errors that might arise from incorrect orientation.

In an installation where the fluid is corrosive, a flow-sensing member of corrosion resistant material is exposed to the fluid stream and a suitable indicating mechanism that is responsive to the positioning of the sensing member is completely isolated from the corrosive fluid. The isolation of the indicating mechanism from the corrosive fluid is usually provided by means of a diaphragm or by sealing means in the form of one or more corrosion resistant O-rings. Since such conventional sealing means are subject to deterioration and structural failure, there is need for completely reliable means to isolate the response mechanism from the corrosive fluid. In this regard, the invention is characterized by the concept of isolating the responsive mechanism from the corrosive fluid by an uninterrupted wall of corrosion resistant material such as a suitable inert plastic or a suitable metal such as stainless steel.

Another need for improvement in some uses of a fluid flow indicator is the provision of a selected threshold of response to the dynamic pressure of the fluid stream. Such a device indicates the presence or absence of a given minimum dynamic pressure and may have utility, for example, to indicate when a pump for creating a liquid stream fails or is not supplied with the liquid. When the pump is dry it creates a gaseous stream with a dynamic force below the threshold of response and consequently the gaseous stream fails to actuate the indicating mechanism. Thus such a device with an appropriate threshold distinguishes between a liquid stream and a gaseous stream.

Since the sensing member of a flow indicator of this general type is necessarily positioned for direct impact by the fluid stream, the sensing member may be dimensioned to substantially completely span the stream and may be biased with a predetermined counterforce to oppose the stream. Here again a threshold of response is provided but in this instance the device not only indicates whether or not a selected minimum pressure differential exists across the device but also serves the specific purpose of substantially preventing fluid flow in the absence of the selected minimum pressure differential.

Another need is to provide an indicating mechanism that is dependable and constant with respect to its response to movement of the sensing member and at the same time is of simple construction with a minimum number of working parts. A feature of the preferred practice of the invention is that a sensing member the position of which is to be detected is made of ferromagnetic material and the mechanism for detecting the movement of the sensing member includes a pair of opposed permanent magnets straddling the path of movement of the sensing member. When the ferromagnetic member moves into position between the two permanent magnets, the two magnetic fields are altered with consequent reduction of the mutual repelling magnetic force and the presence of the sensing member is detected by the reduction of the magnitude of the mutual repelling force.

The reduction in the magnitude of the mutual repelling force may be detected in any suitable manner. In the presently preferred practice of the invention, at least one of the permanent magnets is movable for the creation of relative movement between the two permanent magnets and the relative movement between the two magnets creates the desired indication. The preferred practice of the invention is further characterized by the concept of a signaling circuit responding to the relative movement between the two magnets.

In some installations the important need is reliable and accurate operation of the fluid flow indicator over an extensive range of temperatures up to 300° F. or higher.

This requirement is met by employing ceramic permanent magnets that are not affected by temperatures up to an upper limit of approximately 350° F. An important advantage of using such ceramic permanent magnets is that in the event that the temperature does climb high enough to affect the magnetic force created by the permanent magnets, the permanent magnets completely recover when the temperature subsequently drops below the given upper limit.

In many instances either visual or auditory signals are required to indicate the presence or absence of flow and in such instances the relative movement between the two permanent magnets operates suitable signal means. Where visual indications are required at the location of the device, suitable lamp means is added to the exterior of the device. Thus a red lamp may be energized as a warning that fluid flows does not exist.

In some instances the requirement is not only to indicate whether or not fluid is flowing through the device but also to indicate the direction of flow when flow does occur. For this purpose the invention takes advantage of the bi-directional operation of the flow indicator. Three pairs of permanent magnets and three corresponding switch means may be provided for this purpose. A red warning lamp may be energized at the normal neutral position of the sensing means; a lamp of a second color illuminating an arrow pointing in one direction may be energized at one limit position of the sensing member; and a third lamp of a third color illuminating an arrow pointing in the opposite direction may be energized at the other limit position of the sensing member.

The features and advantages of the invention may be understood from the following detailed description and the accompanying drawings.

In the drawings which are to be regarded as merely illustrative:

FIG. 1 is a side elevation of a selected embodiment of the invention;

FIG. 2 is a longitudinal medial section of the embodiment;

FIG. 3 is a transverse section taken along the line 3—3 of FIG. 2;

FIG. 4 is a fragmentary section on an enlarged scale showing the magnetic means for detecting changes in the position of the flow-responsive member;

FIG. 5 is a side elevational view of a modified form of the invention; and

FIG. 6 is a longitudinal section of the modified embodiment.

The principal parts of the invention include: a flow chamber 10 (FIG. 2) of the shape of a half sphere having opposite screw threaded ports 12 and 14 for fluid flow therethrough; a hermetically sealed compartment 15 adjacent the flow chamber; a vane 16 of semicircular configuration mounted on a hinge axis 18, the vane spanning the flow chamber 10 radially to swing in response to impact of fluid flowing through the chamber; an arm in the form of a blade element 20 of ferromagnetic material carried by the vane 16 to swing therewith, the plane of the blade being perpendicular to the hinge axis 18; and suitable magnetic means in the sealed compartment 15 to sense the position of the blade element 20 and thereby sense the position of the vane 16.

The flow chamber 10 is largely formed by a body 22 having a circular rim 24 and having an external screw thread 25 adjacent the rim. The hermetically sealed compartment 15 comprises a housing or shell 26 of the configuration of an inverted cup with the open end of the cup closed by a heavy transverse end wall 28 which is permanently united with the shell in a fluid tight manner. The heavy end wall 28 of the hermetically sealed compartment 15 slidingly fits into the body 22 to close the flow chamber 10, the end wall being embraced by an O-ring 30 to seal the joint.

For the purpose of connecting the hermetically sealed compartment 15 to the body 22 in a positive manner, the end wall 28 of the compartment is formed with a radial flange 32 to cooperate with a threaded ring or nut 34, the radial flange being dimensioned to lie against the rim 24 of the body. The ring-shaped nut 34 has an internal screw thread to engage the external screw thread 25 of the body 22 and is formed with an inner radial flange 35 to overlap the radial flange 32 of the end wall 28. It is apparent that the ring-shaped nut 34 may be loosened for separation of the body 22 for access to the flow chamber 10. For convenience the ring-shaped nut 34 may be provided with spaced radial bores 38 in a well known manner for engagement by a suitable spanner.

Within the scope of the invention any suitable magnetic means may be employed in the hermetically sealed compartment 15 to sense changes in position of the blade element 20. In the presently preferred practice of the invention two permanent ceramic magnets 40 and 42 (FIG. 3) straddle the path of the blade element 20 and have confronting opposed magnetic poles for the creation of mutual repelling magnetic force. When the blade element 20 moves into position between the two permanent magnets 40 and 42 it links with the two magnetic fields and thus changes the magnitude of the mutual repelling force and suitable signal-creating means is provided to respond to the changes in magnitude of the repelling force. In the particular arrangement shown in FIG. 3, the two permanent magnets 40 and 42 are adapted for relative movement in response to changes in magnitude of the mutual repelling force and suitable switch means is operated by the relative movement.

The thick end wall 28 of the hermetically sealed compartment 15 forms an integral bracket 44 in the compartment, which bracket has a circular recess 45 to fixedly retain the permanent magnet 40. The bracket 44 is further formed with an arm extension 46 which is forked at its outer end to receive a cross pin 48 for pivotally mounting a bell crank, generally designated 50. A relatively long arm 52 of the bell crank carries the second permanent magnet 42 and the bracket 44 is formed with a suitable recess 54 to permit the second permanent magnet to approach close to the path of the blade element 20. The second shorter arm 55 of the bell crank 50 carries an adjustable screw 56 for operating a microswitch 58 that is mounted on the side of the arm extension 46 of the bracket. It can be seen in FIGS. 3 and 6 that the blade element 20 is mounted in a deep slot 60 of semicircular configuration and that this slot has exceedingly thin opposite side walls 62 in the region of the two permanent magnets 40 and 42. Thus the slot 60 is necessarily in fluid communication with the flow chamber 10 but is hermetically isolated from the compartment 15.

The combined vane 16 and blade element 20 may be mounted in any suitable manner for swinging movement about the hinge axis 18. In the present construction the combined vane and blade element is provided with a pair of trunnions 64 as indicated in FIG. 3 which are journaled in bearing sleeves 65 of suitable material such as Teflon, the two sleeves being mounted in corresponding radial bores in the end wall 28.

Any suitable means may be provided to bias the vane 16 to cause the vane to seek the neutral position shown in FIG. 2 at which position the vane spans the path of flow between the two ports 12 and 14. In this particular embodiment of the invention the biasing means comprises a pair of curved leaf springs 70 which are mounted on opposite sides of the vane 16 by a suitable screw 72 and nut 74. At the neutral position of the vane 16 the two leaf springs 70 bear with equal pressure against the end wall 28 but when dynamic fluid pressure against one side of the vane causes the vane to swing to a limit position the corresponding leaf spring 70 extends with sliding motion along the end wall 28 as indicated in FIG. 6.

It is essential that the combined end wall 28 and bracket 44 be made of nonmagnetic material and for some installations of the invention it is further essential that the material be an inert material capable of resisting corrosion. A suitable grade of nonmagnetic stainless steel may be employed for this purpose. A feature of the invention, however, is that the body 22 as well as the shell 26 and the end wall 28 may be made of suitable high strength plastic material such as Celcon, an acetal copolymer (Celanese Corporation of America). The blade element 20 must be made of ferromagnetic material, preferably material of low magnetic retentivity such as soft iron or a low carbon steel.

In various practices of the invention the microswitch 58 may be either normally closed or normally open, i.e. normally closed or normally open when the ferromagnetic blade element 20 is interposed between the two permanent magnets 40 and 42. It is also apparent that the microswitch 58 may be employed in any type of circuit, for example in a control circuit. In the illustrated embodiment of the invention the microswitch 58 is normally closed and when closed illuminates a red signal lamp 75 that is mounted on the exterior of the shell 26.

The manner in which the described embodiment of the invention functions for its purpose may be readily understood from the foregoing description. In the absence of dynamic pressure of flowing fluid acting against the vane 16, the vane is in the neutral position shown in FIG. 2 and the warning lamp 75 is energized to indicate that no flow exists in the fluid system. When fluid flow does exist through the flow chamber 10 the vane is pushed to one side to permit free flow between the two ports 12 and 14, the position of the vane and the corresponding position of the blade element 20 being shown in FIG. 6.

With the blade element 20 swung away from the two permanent magnets 40 and 42, the mutual repelling magnetic force that is created by the opposite polarity of the two permanent magnets causes the permanent magnet 42 to move away from the permanent magnet 40 and thus operate the bell crank 50 as shown in FIG. 4. The pivotal movement of the bell crank 50 operates the microswitch 58 in the manner shown in FIG. 4 and thereby deenergizes the warning lamp 75. It is apparent that the device will respond in the same manner to the opposite direction of flow, the device being in this sense bi-directional.

As heretofore stated, in some practices of the invention it is intended that the device will indicate whether or not the fluid flow exists above a predetermined magnitude. For this purpose the two leaf springs 70 may be selected to maintain the vane 16 in a flow blocking position in the absence of a predetermined pressure against the vane. For example, if the device is used in a line through which a liquid is normally driven by a pump at a pressure well above 5 p.s.i. and the airstream through the device that is created by the pump when the pump is dry has a dynamic pressure of approximately 1 p.s.i., the leaf spring 70 may be designed to resist a pressure against the vane 16 up to a magnitude of 5 p.s.i. Thus the device would create a warning signal if the pump fails completely or if the pump operates but is not supplied with the liquid. The threshold may be set at various magnitudes to fit the needs of various installations.

A feature of the invention is that for some purposes the vane 16 may be dimensioned to fit the inner wall of the flow chamber with relatively close dimensions. In such a device the vane serves in effect as a valve member that does not permit any significant amount of flow if the pressure of the liquid on the upstream side of the device falls below a predetermined magnitude.

The modified embodiment of the invention shown in FIGS. 5 and 6 is largely identical in construction with the first embodiment of the invention, as indicated by the use of corresponding numerals to indicate corresponding parts. The modification consists in providing two additional magnetic sensing assemblies in the hermetically sealed compartment 10 to sense the two opposite directions of flow through the device in addition to sensing the absence of flow. For this purpose a magnetic sensing assembly, generally designated 76, is added to respond to the blade element 20 at one limit position of the vane 16 and a second magnetic assembly, generally designated 78 is added on the other side of the compartment to respond to the blade element at the opposite limit position of the vane. Each of the two added assemblies 76 and 78 is of the same character as the previously described assembly, each assembly including a pair of permanent magnets 40 and 42 for actuating a bell crank 50 to operate a corresponding microswitch.

In this instance the three microswitches operate three separate indicating lamps. The central magnetic sensing assembly controls the previously mentioned signal lamp 75. The magnetic sensing assembly 76 energizes a second signal lamp 80 when the direction of fluid flow is to the right as viewed in FIGS. 5 and 6. The signal lamp 80 may be green and may include an arrow 82 to indicate the direction of flow. The third sensing assembly 78 controls a third signal lamp 84 which may be colored yellow and may include an arrow 85 that is illuminated to indicate the opposite direction of flow.

My description in specific detail of the selected embodiments of the invention will suggest various changes, substitutions and other departures from my disclosure within the spirit and scope of the appended claims.

I claim:

1. In a flow indicator, the combination of:
a body forming a chamber with two opposite ports for fluid flow therethrough;
a vane movably mounted in the chamber and biased to seek a position across the direction of fluid flow and to move through a range of positions in response to the dynamic pressure of the fluid flow;
an element of ferromagnetic material;
means for drivingly connecting said element to the vane for movement along a predetermined path corresponding to said range of positions;
wall means enclosing and isolating a space adjacent said chamber, said wall means including a pair of spaced walls of non-magnetic material straddling said path;
a pair of permanent magnets in said space straddling the pair of walls at a station on the path whereby said element is interposed between the two magnets when the element is at the station,
said magnets having confronting poles of like polarity to create mutual repellant force between the two magnets whereby the persence of the element at the station reduces the repellant force; and
indicating means responsive to the reduction in the repellant force.

2. In a flow indicator, the combination of:
a body forming a chamber with two opposite ports for fluid flow therethrough;
a vane movably mounted in the chamber and biased to seek a position across the direction of fluid flow and to move through a range of positions in response to the dynamic pressure of the fluid flow;
an element of ferromagnetic material;
means for drivingly connecting said element to the vane for movement along a predetermined path corresponding to said range of positions;
wall means enclosing and isolating a space adjacent said chamber, said wall means including a pair of spaced walls of non-magnetic material straddling said path;
a pair of permanent magnets in said space straddling the pair of walls at a station on said path whereby said element is interposed between the two magnets when the element is at the station,
said magnets having confronting poles of like polarity to create mutual repellant force between the two magnets whereby the presence of the element at the station reduces the repellant force;

one of said magnets being movable between a first position adjacent the path and a second position away from the path and being biased towards the first position whereby said one magnet seeks the first position when the element is at the station and moves to the second position when the element is away from the station; and switch means operated by movement of the said one magnet between its two positions.

3. In a flow detector to detect the presence or absence of a fluid stream having a dynamic pressure above a given magnitude, the combination of:

a body forming a chamber with two opposite ports for fluid flow therethrough;

a vane in the chamber mounted for movement through a range of positions in response to fluid flow through the chamber;

means to oppose the responsive movement of the vane and exerting a yielding opposing force substantially equal to the force exerted by dynamic pressure of the given magnitude;

an element of ferromagnetic material;

means for drivingly connecting said element to the vane for movement along a predetermined path corresponding to the range of positions of the vane;

a pair of permanent magnets straddling the path at a station on the path whereby said element is interposed between the magnets when the element is at the station, said magnets having confronting poles of like polarity to create mutual repellant force across the station between the two magnets whereby the presence of the element at the station reduces the repellant force; and means responsive to the redutcion of the repellant force.

4. A combination as set forth in claim 3 which includes wall means enclosing and isolating a space adjacent said chamber, said wall means including a pair of spaced walls of non-magnetic material straddling said path; and in which the pair of permanent magnets straddles the pair of walls.

5. In a flow detector, the combination of:

a body forming a chamber with two opposite ports for fluid flow therethrough;

a vane in the chamber mounted in the path of fluid flow for movement through a range of positions in response to fluid flow through the chamber, said positions including a first central position when substantially no flow occurs, a second position to one side of the central position when the flow is in one direction, and a third position on the other side of the central position when the flow is in the opposite direction;

a ferromagnetic element in said chamber;

means connecting the ferromagnetic element to the vane for movement thereby along a predetermined path corresponding to the range of positions of the vane;

spring means separate from said connecting means to oppose the movement of the vane in both directions away from the first position;

three pairs of magnets straddling said path, including a first pair at a first station on the path corresponding to the first position of the vane, a second pair at a second station on the path corresponding to the second position of the vane, a third pair at a third station on the path corresponding to the third position of the vane, the magnets of each of said pairs having confronting poles of like polarity to create mutual repellant magnetic force between the two magnets whereby the presence of the element between the two magnets reduces the repellant force; and three means to sense the reduction of the repellant force at the three pairs of magnets respectively thereby to sense the position of the vane.

6. A combination as set forth in claim 5 in which at least one of the two permanent magnets of each of the three pairs of permanent magnets is movable relative to the other and is biased towards the other whereby the spacing between the two magnets varies with the magnitude of the repellant force; and which includes means to create signals in response to reduction in the spacing of the two magnets of each of the pairs of magnets.

7. A combination as set forth in claim 6 which includes wall means enclosing and isolating a space adjacent said chamber, said wall means including a pair of spaced walls straddling said path; and in which each of the pairs of magnets straddles the pair of walls.

8. In a device of the character described, the combination of:

walls forming a chamber of generally hemispherical configuration with two opposite ports for fluid flow therethrough;

a vane spanning the chamber and journalled to swing through a range of positions including a position extending across the chamber to block fluid flow through the chamber and a position inclined in the direction of fluid flow to permit fluid flow through the chamber;

spring means urging said vane to its fluid blocking position to prevent fluid flow therethrough when the pressure differential across the chamber drops to a predetermined magnitude;

a ferromagnetic element connected to the vane for movement thereby along a predetermined path corresponding to said range of positions;

wall means enclosing and isolating a space adjacent said chamber, said wall means including a pair of spaced walls of non-magnetic material straddling said path;

a pair of permanent magnets in said space straddling the pair of walls at a station on the path whereby said element is interposed between the two magnets when the element is at the station, said magnets having confronting poles of like polarity to create mutual repellant force between the two magnets whereby the presence of the element at the station reduces the repellant force, one of said magnets being movable in response to changes in said repellant force; and indicating means responsive to the movement of said one magnet.

9. In a flow indicator, the combination of:

means forming a chamber with two opposite ports for fluid flow therethrough;

a vane movably mounted in the chamber to move through a range of positions in response to dynamic pressure of fluid flow through the chamber;

leaf springs on opposite sides of the vane effective between the vane and the chamber to bias the vane to seek a position extending across the direction of fluid flow whereby the vane seeks said position in the absence of fluid flow sufficient to overcome the pressure of one of said leaf springs, said leaf springs exerting a predetermined magnitude of force to prevent movement of the vane out of said position when the dynamic pressure of fluid in the chamber is below a predetermined magnitude;

wall means enclosing and isolating a space adjacent said chamber, said wall means including a pair of spaced walls of non-magnetic material straddling said path;

a pair of permanent magnets in said space straddling the pair of walls at a station on the path whereby said element is interposed between the two magnets when the element is at the station, said magnets having confronting poles of like polarity to create mutual repellant force between the two magnets whereby the presence of the element at the station reduces the repellant force, one of said magnets being movable in response to changes in said repellant force; and indicating means responsive to the movement of said one magnet.

References Cited
UNITED STATES PATENTS

| | | | |
|---|---|---|---|
| 1,292,334 | 1/1919 | Larsen | 200—81.9 |
| 1,994,970 | 3/1935 | Turner | 200—81.9 |
| 2,924,682 | 2/1960 | Winterburn | 335—205 |

FOREIGN PATENTS

| | | |
|---|---|---|
| 1,055,183 | 10/1953 | France. |
| 621,485 | 7/1961 | Italy. |

BERNARD A. GILHEANY, *Primary Examiner.*

H. BROOME, *Assistant Examiner.*